Figure 1:
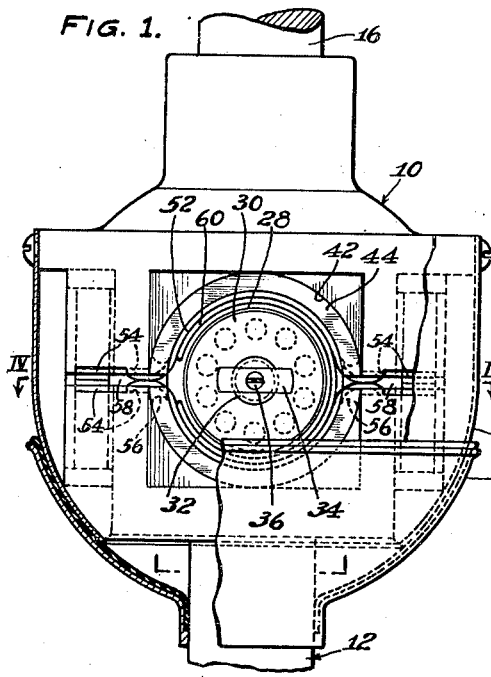

May 11, 1937. E. E. LA ROSE 2,079,622
UNIVERSAL JOINT
Filed Feb. 21, 1936 2 Sheets-Sheet 1

WITNESSES
A. B. Wallace.
A. H. Oldham.

INVENTOR.
Eugene E. LaRose
BY Brown, Critchlow & Flick
his ATTORNEYS

May 11, 1937.  E. E. LA ROSE  2,079,622
UNIVERSAL JOINT
Filed Feb. 21, 1936  2 Sheets-Sheet 2

WITNESSES
A. B. Wallace
A. H. Oldham

INVENTOR.
Eugene E. La Rose
BY Brown, Critchlow & Flick
his ATTORNEYS.

Patented May 11, 1937

2,079,622

UNITED STATES PATENT OFFICE 2,079,622

UNIVERSAL JOINT

Eugene Everett La Rose, Youngstown, N. Y.

Application February 21, 1936, Serial No. 65,118

16 Claims. (Cl. 64—7)

This invention relates to universal joints of the type adapted to connect a rotary drive shaft and a driven shaft where the axes of the shafts are at an angle.

Various types of universal joints heretofore provided have been objectionable because of failure to stand up in service. More particularly, prior joints have not been able to provide a load-transmitting drive at an angle with the same freeness of action at all points in the rotation of the joint. Again, the axes of the driving and driven shafts have not maintained their central alignment at all angles of operation. Former joints, likewise, have not operated without considerable wear and friction and the result has been that balance is not maintained and vibration occurs in the operation of the joint.

The failure of known types of universal joints to function satisfactorily over long periods is particularly evident in automobiles wherein the drive shaft and the crank shaft of the engine are connected at an angle by a universal joint. The angle between the axes of the shafts constantly varies as the springs mounting the rear wheels work up and down. Fast acceleration and deceleration, alternate braking by the motor and wheels, and the ever-changing load on the vehicle and motor all have contributed to severely test known types of universal joints, and they have been a constant source of repair in most automobiles.

It is an object of my invention to avoid and overcome the foregoing and other difficulties of known universal joints by the provision of an improved, sturdy, long-wearing and relatively inexpensive joint capable of use in various relations to connect rotary driving and driven members whose axes are at an angle to each other, but particularly adapted for use with automobiles.

Another object of my invention is to provide a universal joint having the same freeness of torque-transmitting action regardless of the angle, within wide limits, between the driving and driven shafts and the degree of rotation of these shafts.

Another object of my invention is the provision of a universal joint which is always in balance with the joint connecting the driving and driven shafts at a constant angle and alignment.

Another object of my invention is to provide a frictionless universal joint and one which is self-centering from the torsional forces applied to the drive shaft, thereby further to maintain balance and eliminate vibration.

Another object of my invention is to provide a universal joint with adjustable means whereby any wear that occurs may be readily taken up.

The foregoing and other objects of my invention are achieved by the provision of a universal joint including a socket member, a ball member received in the socket member, and pins on the ball member extending at substantially right angles to the axis of the ball member and at spaced points around it. The socket member is formed with recesses to receive the pins, and sleeves are provided between each pin and its associated recess in the socket member. Means on each pin engage with the associated sleeve and are adapted to have relative movement therewith, and further means are provided for supporting each sleeve for limited rotary movement about its own axis. The ball member is provided with an apron having a sliding seal with the socket member so that suitable lubricating means may be held in the joint.

Figure 2:
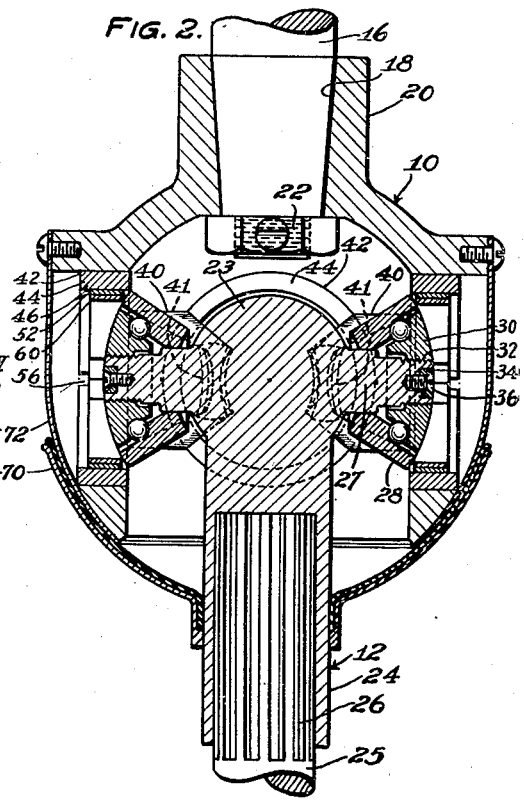
Figure 3:
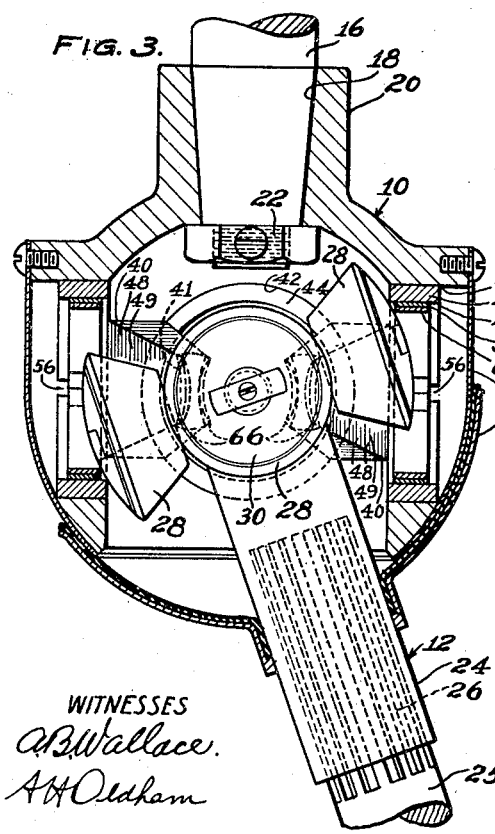
Figure 4:
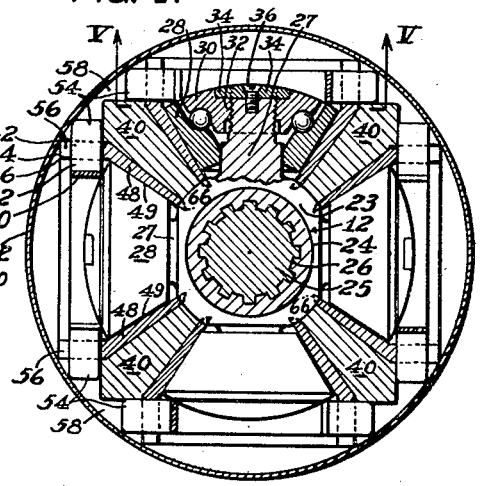
Figure 5:
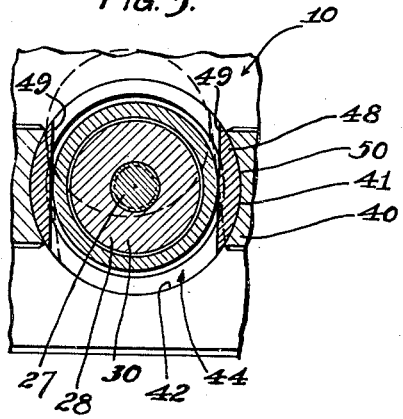
Figure 6:
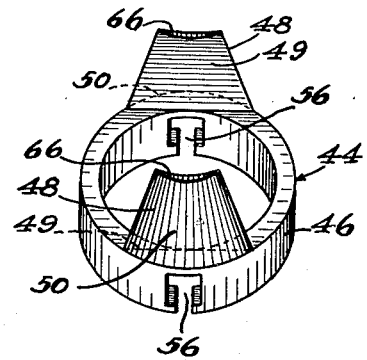
Figure 7:
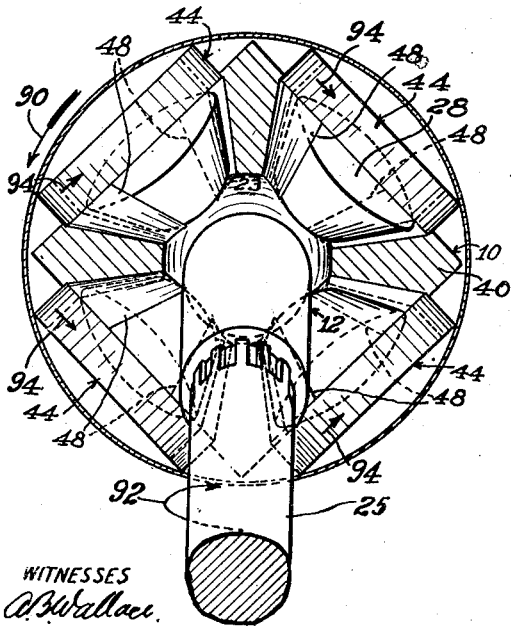
Figure 8:
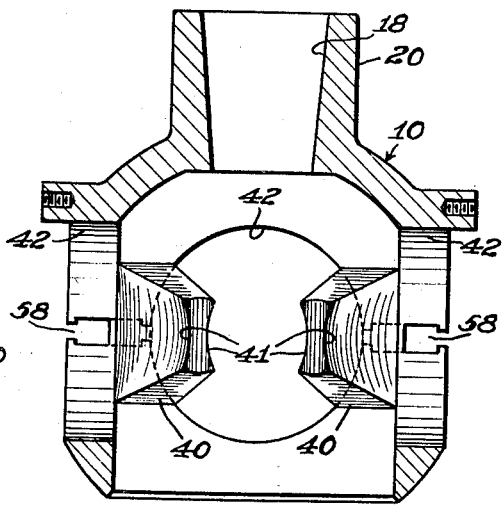

Referring to the drawings, Fig. 1 is a side elevation, partly broken away, of a universal joint embodying the principles of my invention; Fig. 2 is a view similar to Fig. 1 but is a longitudinal, diametric, cross-sectional view of the joint; Fig. 3 is a view similar to Fig. 2 but illustrates the driving and driven shafts secured to the joint at an angle to each other; Fig. 4 is a cross-sectional view taken on line IV—IV of Fig. 1; Fig. 5 is a cross sectional view taken on line V—V of Fig. 4; Fig. 6 is a perspective view of one of the sleeves incorporated in my improved joint; Fig. 7 is a view similar to Fig. 4 but with the shafts at an angle and with the joint rotated; and Fig. 8 is a view similar to Fig. 2 but with the socket member alone illustrated.

The particular joint illustrated in the drawings, and incorporating the features of my invention, includes a socket member 10 which receives a ball member 12. The socket member 10 is preferably secured to the drive shaft, indicated by the numeral 16, as by providing a tapered bore 18 in an upstanding hub 20 on the socket member. The drive shaft 16 is provided at its end with a corresponding taper and a nut 22 holds the drive shaft in the socket member. The ball member 12 is formed with a ball 23 and a shaft portion 24 and may be connected in any desired manner to a driven shaft 25. In the drawings the connection between the driven shaft 25 and the shaft portion 24 is illustrated as a spline 26.

The ball member 12 is provided with a plurality of trunnion pins 27 extending at an angle to the axis of the ball member and spaced at points circumferentially of the ball 23. Preferably four pins 27 are provided spaced 90° apart around the ball and at right angles to the axis of the member. Each pin 27 supports a truncated conical roller 28 on a frictionless bearing 30. The radially inner end of each roller 28 may have a steadying or bearing engagement with the base of its associated pin 27 if desired.

An important feature of my invention is the provision of readily accessible and operable means for taking up any wear of the bearings or of the rollers 28. In the embodiment of the invention shown, each bearing 30 is mounted upon a threaded end 32 of each pin 27 and is locked in any position on the thread 32 by means of a key 34 received in a groove in the end of the pin and having ends extending into grooves in the bearing 30. A screw 36 holds each lock pin 34 in locking position.

The socket member 10 is formed with suitable recesses adjacent each pin 27 and its associated roller 28, and these recesses may be defined by inwardly directed ribs or lugs 40 formed on the inside of the socket member and extending axially thereof. The radially inner surfaces of the ribs 40 are defined by a cylinder extending axially of the socket member 10 and of a diameter so that the ribs have a line contact and a working fit with the ball 23. This facilitates centering of the ball and socket members as the ribs contact the ball at four points, as illustrated in Fig. 4, but does not interfere with assembly or removal of the parts.

The lateral surfaces of the ribs 40 adjacent each pin 27 are formed conically, as at 41, and the socket member 10 is provided with circular openings 42 in order to receive sleeves 44. As illustrated in the several figures of the drawings, but particularly in Fig. 6, each sleeve 44 includes a ring portion 46 having opposing downwardly extending lugs 48. The lugs 48 of each sleeve are formed with flat inner faces 49 which engage with line contact with a roller 28 and which provide for relative rolling movement as hereinafter explained. The outside surfaces 50 of the lugs 48 are conical and are received in the conical recesses 41 in the ribs 40.

The sleeves 44 are adapted to have limited rotary movement in the socket member 10 and I provide for this by securing the sleeves in the recesses in the socket member by spring means. Having particular reference to Fig. 1, a suitable spring connection is illustrated as including springs 52 having ends 54 extending through slots 56 cut in opposite sides of the ring 46 of the sleeve and anchored in recesses 58 provided in the socket member. An inner circular spring 60 is generally incorporated in the structure to fit snugly within the springs 52 whereby the sleeve 44 is anchored in the socket member 10 but is free to have limited rotary movement about its own axis in the socket member as determined by the dimensions of the slots 56. The springs 52 function to hold the sleeve resiliently in a central position so that the flat inner surfaces 49 of the lugs 48 of each sleeve are parallel to the axis of the driving shaft 16.

The sleeves 44 have a second fuction, namely, to assist in centering the ball member 12 in the socket member 10. This is achieved by forming the inner ends of the lugs 48 with curved surfaces 66 which engage with the ball 23 as best illustrated in Fig. 4. Thus, when the sleeves 44 are removed by releasing and removing the springs 52 it is possible to remove the ball member 12 from the socket member 10 even though the ribs 40 thereof engage with the ball 23 to better support the sleeves and assist in centering the ball.

The ball member 12 is provided with an apron 70 which has a sliding and sealing fit with a cover 72 secured to the socket member 10. Light grease or heavy oil is generally used to fill the interior of the joint and for this purpose a grease valve, not shown, may be provided at some point in the cover 72 or in the socket member 10.

The operation of my improved joint is generally similar to that of an ordinary universal joint. More particularly considering the joint in the position shown in Fig. 3, when the drive shaft 16 begins to turn, the rollers 28 in the plane parallel with the surface of the drawings, roll inwardly upon the flat surfaces 49 of the lugs 48 of the sleeves 44 until, when the shaft has turned through 90°, the rollers are at their central position in the sleeves. Simultaneously with the roller movement just described the pair of rollers at right angles to the first-named pair move from their central position with respect to the sleeves out to the position illustrated in the drawings for the first pair of rollers. Thus, the rollers move arcuately back and forth in the sleeves as the joint rotates, as will be understood.

As the rollers 28 move from a central position in the sleeves 44 along the flat surfaces 49 of the lugs 48 thereof, the sleeves rotate on their own axes in the bearing supports 41 and 42 provided, and this rotary movement is against the action of springs 52. The greater the angle of misalignment between the driving and driven shafts, (and it is generally not more than 20° in which position the joint is shown), the greater the movement of the rollers outwardly of a central position and the greater the rotary movement of the sleeves 44. The rotary movement of the sleeves 44 is illustrated in Fig. 5 wherein the sleeve and roller are shown in their central position in solid lines. The dotted lines, in the same figure, illustrate the relative positions of the sleeve and roller when the roller has moved out on the flat surfaces 49 of the sleeve during the rotation of the joint while carrying driving torque. This novel operation I have found eliminates binding of the joint regardless of the angle of misalignment of the shafts within relatively wide limits or the rotary position of the joint and has resulted in maintenance of joint balance and elimination of vibration.

To further illustrate the mounting and operation of the sleeves 44, Fig. 7 has been provided wherein the driven shaft 25 has been illustrated as connected to the driving or socket member 10 at an angle of approximately 160° (20° misalignment of shafts). In other words the shaft 25 secured to the ball member 12 of Fig. 4 has been bent down 20° and the joint of this figure rotated through 45° with the socket member driving in the direction shown by the arrow 90. The driven shaft 25 and its associated ball member 12 resist, in the direction of the arrow 92, the turning force of the drive shaft and socket member.

Due to these torsional forces, as the rollers 28 move out on the flat surfaces 49 of the sleeves 44, the sleeves rotate on their own axes against the action of the springs 52, as shown by the arrows 94. Thus in the first 180° of rotation of the joint of Fig. 7 the sleeves turn from a central position to a tilted position and back to the central position, and in the last 180° of rotation turn to an oppositely tilted position and back to the central position. The springs 52 store up energy when the sleeves move from a central to a tilted position but give it back when the sleeves return to their central position. The movement of the rollers 28 back and forth on the flat surfaces 49 of the sleeves 44 is accomplished without binding regardless of the angular position of the joint due to the fact that the sleeves turn to allow free movement. Thus it will be appreciated that my joint is a true universal and cannot be classed with prior art flexible couplings of the well-known double pivot construction.

The axes of the driving and driven members are maintained in alignment at all times by the sliding contact between the ball 23, the ribs 40 and the ends 66 of the lugs 48 of the sleeves, but in addition the joint is self-centering from the torsional force applied to the drive shaft because of the rocking movement of the sleeves and the tendency of the springs 52 to move the sleeves to their normal position.

If any wear occurs in my joint the parts may be readily taken up by removing the apron 70 and cover 72 from the joint, taking out the lock screws 36 and keys 34 and turning up the bearings 30 upon the threaded portions 32 of the pins 27.

The rollers 28 carried by the pins 27 make a line contact with the flat inner surfaces 49 of the sleeves 44 and normally this line contact provides sufficient surface to transmit any desired load. However, in certain instances where the torque transmitted is very heavy I contemplate replacing the rollers 28 with sliding blocks which have a greater area of contact with the lugs of the sleeves. Preferably the use of blocks is avoided as the friction of the joint is increased thereby. However, it should be appreciated that the principles of my invention can be incorporated with a joint employing sliding block structure.

It will be seen from the foregoing description that the objects of my invention have been achieved by the improved joint just described. The angle between the driven and driving members can be within relatively wide limits and yet the same freeness of action of the joint in any and all rotary positions is obtained. The driving and driven shafts are maintained in proper alignment at all times and are substantially self-centered. Vibration is reduced and balance is maintained, and the joint is substantially frictionless, yet may be readily adjusted if any wear does occur. As a result the joint is sturdy and long-wearing and can be adapted to many uses but is particularly beneficial for use with automobiles where conditions are most severe.

In accordance with the patent statutes one embodiment of my invention has been illustrated and described in detail. However, it should be understood that I am not limited thereto or thereby but that my invention is defined in the appended claims.

I claim:

1. A universal joint comprising a drive shaft, a driven shaft, a cup on the drive shaft, a ball on the driven shaft received in the cup on the drive shaft, a plurality of pins secured to the ball at substantially right angles to the driven shaft and spaced substantially equally about the ball, the cup having cone-shaped openings each receiving a pin, a truncated cone-shaped roller mounted on frictionless bearings on each pin near its extremity, means for adjusting each roller along its pin to provide a take-up for wear, a sleeve positioned in each cone-shaped cup opening and adapted to have rotary movement therein about its axis, said sleeves slidably engaging with the ball at their inner ends, spring means associated with each sleeve and limiting the extent of said rotary movement and normally holding the sleeve in a central position, each sleeve having opposed flat surfaces for engagement with a roller and an apron secured to the driven shaft and forming a sliding seal with the cup.

2. A universal joint comprising a drive shaft, a driven shaft, a cup on one of the shafts, a ball on the other shaft received in the cup, a plurality of pins secured to the ball at substantially right angles to the shaft and spaced substantially equally about the ball, the cup having cone-shaped openings each receiving a pin, a truncated cone-shaped roller mounted on frictionless bearings on each pin near its extremity, means for adjusting each roller along its pin to provide a take-up for wear, a sleeve positioned in each cone-shaped cup opening and adapted to have rotary movement therein about its axis, said sleeves slidably engaging with the ball at their inner ends, spring means associated with each sleeve and limiting the extent of said rotary movement and normally holding the sleeve in a central position, each sleeve having opposed flat surfaces for engagement with a roller and an apron secured to the shaft carrying the ball and forming a sliding seal with the cup.

3. A universal joint comprising a drive shaft, a driven shaft, a cup on one shaft, a ball on the other shaft received in the cup, a plurality of pins secured to the ball at substantially right angles to the shaft and spaced about the ball, ribs on the inside of the cup defining tapered openings each receiving a pin, a truncated cone-shaped roller mounted on each pin near its extremity, a sleeve positioned in each tapered cup opening and adapted to have rotary movement therein about the axis of the sleeve, said sleeves slidably engaging with the ball at their inner ends to position it in the cup, spring means associated with each sleeve and limiting the extent of said rotary movement and normally holding the sleeve in a central position, and opposed flat surfaces on each sleeve for engagement with its associated roller.

4. A universal joint comprising a drive shaft, a driven shaft, a cup on one shaft, a ball on the other shaft received in the cup, a plurality of pins secured to the ball at substantially right angles to the ball shaft and spaced substantially equally about the ball, the cup having a recess adjacent each pin and extending parallel to the axis of the cup but on the curvature of the cup, means mounted on each pin near its extremity for movement in the associated recess, a sleeve positioned in each recess and adapted to have rotary movement therein about the sleeve axis, said sleeves slidably engaging with the ball at their inner ends, spring means associated with each sleeve and limiting the extent of said rotary movement and normally holding the sleeve in a central position, each sleeve having opposed flat surfaces for engagement with the means carried by each pin.

5. A universal joint comprising a drive shaft, a driven shaft, a cup on one shaft, a ball on the other shaft received in the cup, a plurality of pins secured to the ball at substantially right angles to the ball shaft and spaced substantially equally about the ball, the cup having a recess adjacent each pin and extending parallel to the axis of the cup but on the curvature of the cup, means mounted on each pin near its extremity for movement in the associated recess, a sleeve positioned in each recess and adapted to have rotary movement therein about the sleeve axis, each sleeve having opposed flat surfaces for engagement with the means carried by each pin.

6. A universal joint comprising a drive shaft, a driven shaft, a cup on one shaft, a ball on the other shaft received in the cup, a plurality of pins secured to the ball at an angle to the ball shaft and spaced about the ball, the cup having openings each receiving a pin, a roller mounted on each pin near its extremity, a sleeve positioned in each cup opening and adapted to have rotary movement therein about its axis, spring means associated with each sleeve and limiting the extent of said rotary movement and normally holding the sleeve in a central position, and opposed flat surfaces on each sleeve for engagement with a roller.

7. In combination in a universal joint, a socket member, a ball member received in the socket member, pins on the ball member and extending at an angle thereto at spaced points around the ball member, the socket member being formed with recesses to receive the pins, a sleeve between each pin and its associated recess in the socket member, means on each pin engaging with its associated sleeve and adapted to have relative movement therewith, and means supporting each sleeve for limited rotary movement about its own axis, the axis of each sleeve being substantially at right angles to the axis of the socket member.

8. The combination recited in claim 7 wherein further the sleeves extend into bearing contact with the ball member and center it in the socket member.

9. The combination recited in claim 7 wherein further resilient means are employed to position the sleeves in the recesses and resist rotary movement of the sleeves.

10. A universal joint comprising a shaft, a ball on the end of the shaft, a plurality of pins extending from the ball at approximately right angles to the axis of the shaft and spaced equally from each other, a roller carried by each pin, a housing surrounding said ball and pins and provided with openings adjacent each roller, a sleeve carried in each opening of the housing and having flat surfaces for engagement with the roller in the opening, means supporting the sleeves for limited rotary movement about their own axes in the housing, and means resiliently holding the sleeves against rotation.

11. A universal joint comprising a shaft, a ball on the end of the shaft, a plurality of members extending from the ball at an angle to the axis of the shaft and spaced from each other, a housing surrounding said ball and members and provided with openings adjacent each member, a sleeve carried in each opening of the housing and having flat surfaces for engagement with the associated member, means supporting the sleeves for limited rotary movement about their own axes in the housing, and means resiliently holding the sleeves against rotation.

12. A universal joint comprising a shaft, a ball on the end of the shaft, a plurality of members extending from the ball at an angle to the axis of the shaft and spaced from each other, a housing surrounding said ball and members and provided with openings adjacent each member, a sleeve carried in each opening of the housing and having flat surfaces for engagement with the associated member, and means supporting the sleeves for limited rotary movement about their own axes in the housing.

13. A universal joint, a driving member, a driven member, trunnions on one member received in recesses in the other member, means associated with the recesses and having flat surfaces for engagement with the trunnions and means for resiliently positioning the flat surfaced means with respect to the recesses but permitting relative rotary movement between the flat surfaced means and the recesses in the operation of the joint.

14. In combination in a universal joint, a socket member, a ball member received in the socket member, pins on the ball member and extending at an angle thereto at spaced points around the ball member, the socket member being formed with recesses to receive the pins, a sleeve between each pin and its associated recess in the socket member, means on each pin engaging with its associated sleeve and adapted to have relative movement therewith, means supporting each sleeve for limited rotary movement about its own axis, and resilient means positioning the sleeves in the recesses and resisting rotary movement of the sleeves.

15. In combination in a universal joint, a socket member, a ball member received in the socket member, pins on the ball member and extending at an angle thereto at spaced points around the ball member, the socket member being formed with recesses to receive the pins, a sleeve between each pin and its associated recess in the socket member, a roller on each pin engaging with its associated sleeve and adapted to have relative movement therewith, said sleeve having flat surfaces engaging with the roller, and means supporting each sleeve for limited rotary movement about its own axis.

16. In combination in a universal joint, a socket member, a ball member received in the socket member, pins on the ball member and extending at an angle thereto at spaced points around the ball member, the socket member being formed with recesses to receive the pins, a sleeve between each pin and its associated recess in the socket member, means on each pin engaging with its associated sleeve and adapted to have relative movement therewith, and means supporting each sleeve for limited rotary movement about its own axis.

EUGENE EVERETT LA ROSE.